(12) United States Patent
Collet et al.

(10) Patent No.: US 9,970,374 B2
(45) Date of Patent: May 15, 2018

(54) ACTUATOR/SENSOR DEVICE

(71) Applicants: CONTINENTAL AUTOMOTIVE FRANCE, Toulouse (FR);
CONTINENTAL AUTOMOTIVE GmbH, Hannover (DE)

(72) Inventors: Thierry Collet, Fontenilles (FR); Jacques Rocher, Saint Orens de Gameville (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 285 days.

(21) Appl. No.: 14/835,889

(22) Filed: Aug. 26, 2015

(65) Prior Publication Data

US 2016/0084186 A1 Mar. 24, 2016

Related U.S. Application Data

(60) Provisional application No. 62/074,854, filed on Nov. 4, 2014.

(30) Foreign Application Priority Data

Sep. 18, 2014 (FR) ..................................... 14 58816

(51) Int. Cl.
*F02D 41/20* (2006.01)
*F02D 41/26* (2006.01)
(Continued)

(52) U.S. Cl.
CPC ............. *F02D 41/20* (2013.01); *F02D 41/28* (2013.01); *G08C 19/00* (2013.01); *H04Q 9/00* (2013.01);
(Continued)

(58) Field of Classification Search
CPC .. F02D 41/20; F02D 41/28; F02D 2041/2027; F02D 2041/2068;
(Continued)

(56) References Cited

U.S. PATENT DOCUMENTS 4,311,986 A * 1/1982 Yee .......................... H04Q 9/14
340/10.31
4,339,723 A * 7/1982 Yee .......................... H04Q 9/14
327/31
(Continued)

FOREIGN PATENT DOCUMENTS

| CN | 103218476 A | 7/2013 |
|---|---|---|
| CN | 203149574 U | 8/2013 |

(Continued)

OTHER PUBLICATIONS

SAE International, SAE J2716 FEB2008 (SENT—Single Edge Nibble Transmission for Automotive Applications), Feb. 2008, whole document.*
(Continued)

*Primary Examiner* — Lindsay Low
*Assistant Examiner* — John Bailey
(74) *Attorney, Agent, or Firm* — Young & Thompson

(57) ABSTRACT

An actuator/sensor device (1) includes: at least one actuator (3) controlled by a control signal and at least one sensor (5) transmitting an acquisition signal, the actuator (3) and the sensor (5) being integrated into the same component; an actuator/sensor pin (8) connecting a terminal of the actuator (3) and an output of the sensor (5) to the same single electrical wire (9) external to the actuator/sensor device (1); and switching elements adapted to cause either the control signal in a control phase (19) or the sensor information in an acquisition phase (21) to be sent on the electrical wire (9).

16 Claims, 2 Drawing Sheets

(51) Int. Cl.
*F02D 41/22* (2006.01)
*F02D 41/28* (2006.01)
*G08C 19/00* (2006.01)
*H04Q 9/00* (2006.01)
*B60R 16/023* (2006.01)
*F02M 25/08* (2006.01)
*F02M 26/45* (2016.01)
*F02M 26/52* (2016.01)

(52) U.S. Cl.
CPC .... *B60R 16/023* (2013.01); *F02D 2041/2027* (2013.01); *F02D 2041/2068* (2013.01); *F02D 2041/281* (2013.01); *F02D 2400/22* (2013.01); *F02M 25/0836* (2013.01); *F02M 26/45* (2016.02); *F02M 26/52* (2016.02)

(58) Field of Classification Search
CPC ........... F02D 2041/281; F02D 2400/22; G08C 19/00; H04Q 9/00; F02M 26/45; F02M 26/52; F02M 25/0836; B60R 16/023
USPC ........ 701/103; 123/353, 472, 476, 478, 479, 123/480, 490, 499, 694, 477, 488, 497, 123/568.26, 516, 519, 520, 521; 361/153, 361/186, 139; 340/12.22, 12.31, 12.32, 340/870.01, 3.53, 3.62, 10.41; 341/173; 73/114.75; 137/493, 493.9, 495
See application file for complete search history.

(56) References Cited

U.S. PATENT DOCUMENTS

| | | | | |
|---|---|---|---|---|
| 6,069,783 A * | 5/2000 | Mount | ................... | F02D 41/004 123/490 |
| 7,163,158 B2 * | 1/2007 | Rossi | ................... | F24F 11/0009 236/51 |
| 7,717,085 B1 * | 5/2010 | Bauerle | ................. | F02D 11/106 123/399 |
| 8,250,911 B2 * | 8/2012 | Bauerle | ................. | G01M 15/02 73/114.36 |
| 9,022,011 B2 * | 5/2015 | Andersson | ............ | F02D 31/006 123/676 |
| 9,634,715 B2 * | 4/2017 | Scheinkerman | ......... | H04B 1/40 |
| 9,696,066 B1 * | 7/2017 | Green | ................ | F02D 19/0642 |
| 2008/0159467 A1 * | 7/2008 | Kassner | ................... | G01P 3/481 377/20 |
| 2010/0114452 A1 * | 5/2010 | Bauerle | ................. | F02D 11/106 701/102 |
| 2010/0207744 A1 * | 8/2010 | Lammers | ............. | G05B 19/042 340/12.32 |
| 2010/0235130 A1 * | 9/2010 | Cordan | ................. | G01D 18/008 702/104 |
| 2010/0258099 A1 * | 10/2010 | Andersson | ............ | F02D 31/006 123/676 |
| 2010/0263632 A1 * | 10/2010 | Miyake | ................... | F02D 41/20 123/476 |
| 2010/0268442 A1 * | 10/2010 | Kabashima | ......... | F02D 41/0025 701/103 |
| 2011/0112744 A1 * | 5/2011 | Grossmann | ......... | B60R 16/0231 701/103 |
| 2011/0310954 A1 * | 12/2011 | Sawaoka | ................. | H03K 7/08 375/238 |

FOREIGN PATENT DOCUMENTS

| | | | | |
|---|---|---|---|---|
| DE | 102009029394 A1 | 3/2011 | | |
| EP | 1624168 A2 | 2/2006 | | |
| EP | 2580600 B1 * | 1/2016 | ......... | G02D 5/24404 |

OTHER PUBLICATIONS

French Search Report, dated May 20, 2015, from corresponding French Application.

* cited by examiner

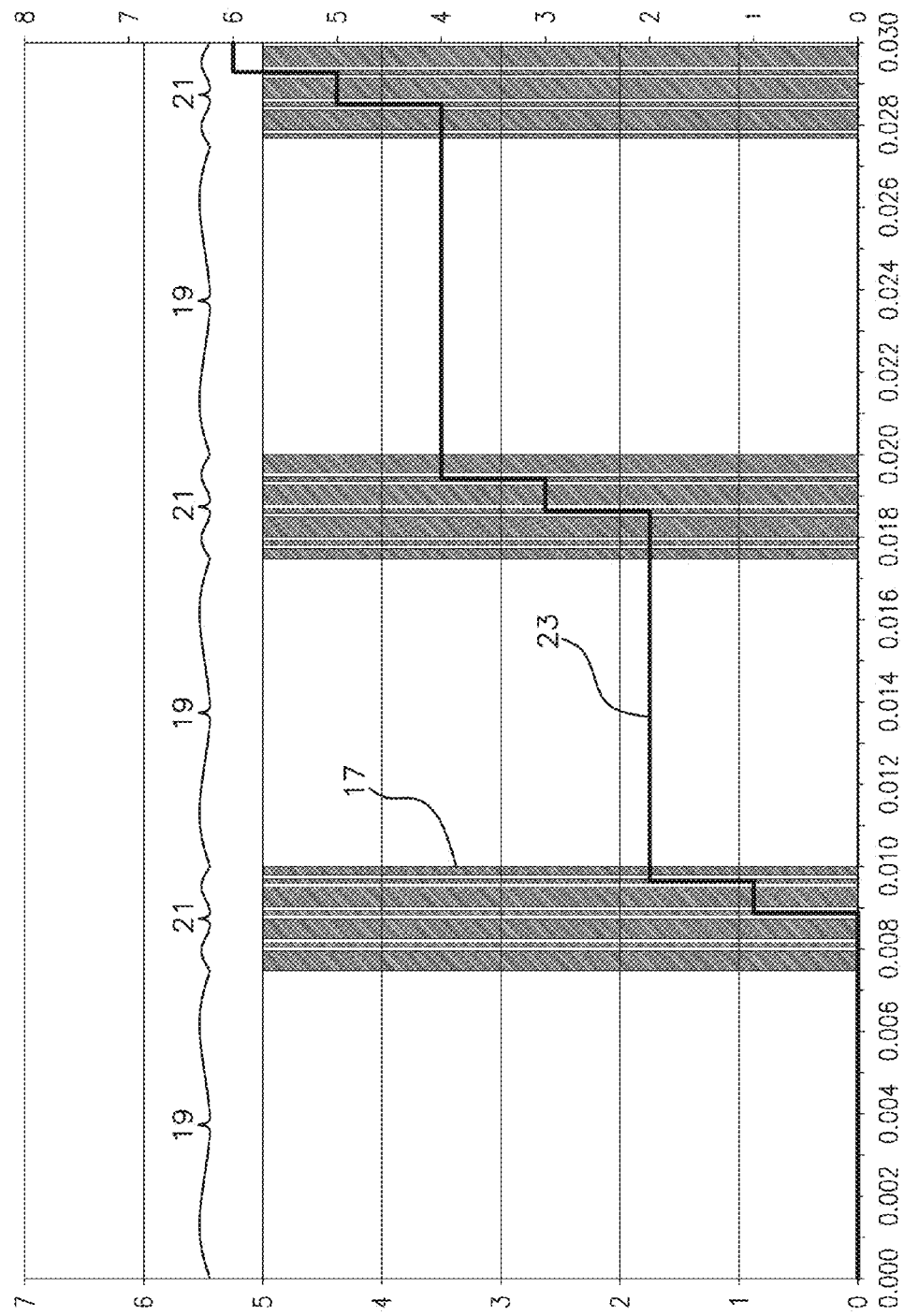

ACTUATOR/SENSOR DEVICE

FIELD OF THE INVENTION

The present invention relates in general to an actuator/sensor device.

The invention has applications in the automobile sector, and particularly in the field of engine control.

BACKGROUND OF THE INVENTION

Modern vehicles comprise a plurality of actuators, as well as a plurality of sensors, which are independently controlled by a processor and make it possible to regulate the operation of an engine. An actuator is generally used to regulate the flow of a fluid such as fuel, air or gas. A sensor, for its part, is used to provide information which represents a physical quantity and will be used to control the actuator. Furthermore, the sensor may also be used to detect possible problems such as leaks, or to diagnose the actuators.

An actuator generally comprises two external connection wires, one for its power supply and the other for controlling it. A sensor, for its part, generally comprises three external connection wires, one for its power supply, one for the ground and one for the data transmission.

The current context of the automobile sector is such that there is a desire to reduce the size of the systems as well as the number of connection wires, in order to reduce costs and increase the reliability of the systems.

To this end, one proposed solution is to integrate the actuator and the sensor in a single component. This solution contributes to reducing the size of the system. However, since the operation of the actuator and the operation of the sensor remain completely independent, such a system requires a plurality of connection wires, and more precisely five according to the example above. Having a large number of connection wires increases the size of the system, increasing the risks of malfunctions and reducing the reliability of said system.

SUMMARY OF THE INVENTION

The invention aims to eliminate, or at least reduce, all or some of the aforementioned drawbacks of the prior art.

It is therefore an object of the present invention to provide an actuator/sensor device making it possible to control an actuator and acquire data measured by a sensor, of which the number of electrical connections as well as the size are limited.

The present invention aims, in particular, to provide such an actuator/sensor device which has high reliability and/or a moderate cost price.

To this end, the present invention provides an actuator/sensor device. According to the invention, the actuator/sensor device comprises at least one actuator controlled by a control signal and at least one sensor transmitting sensor information via an acquisition signal, the actuator and the sensor being integrated into the same component, and it is characterized in that it furthermore comprises:
an actuator/sensor pin connecting a terminal of the actuator and an output of the sensor to the same single electrical wire external to said actuator/sensor device; and
switching means adapted to cause either the control signal in a control phase or the sensor information in an acquisition phase to be sent on the electrical wire.

Tests have shown that such a device is particularly suitable for driving an actuator, as well as for acquiring data via a sensor, and furthermore has good properties.

The integration of the actuator and the sensor in the same single component makes it possible to reduce the size and the cost of the device.

Furthermore, combining the control signal and the sensor information on a single electrical wire advantageously makes it possible to reduce the number of connections as well as the number of electrical wires. The effect of this is thus to reduce the size of the device, reduce the risks of malfunction, due for example to a bad connection or damage to one of the electrical wires, and therefore to increase the reliability of the device.

Furthermore, the switching means advantageously make it possible to avoid loss of the control information and of the sensor information.

According to one embodiment, in this case, the actuator is a valve of the solenoid type. The valve is also advantageously driven by means of a coil.

Such an actuator may be such that it is driven by a pulse width modulation (PWM) signal. This advantageously makes it possible to synthesize continuous signals with the aid of circuits with discrete states.

In one embodiment, the sensor information is transmitted by using a standardized "Single Edge Nibble Transmission" (SENT) communication line. Advantageously, SENT makes it possible to produce a compact and simple arrangement. Furthermore, transmission of the data via SENT may be carried out with a simple cable not requiring a shielded or twisted line. Also, the SENT signals are advantageously insensitive to malfunctions and can be used in conditions of high temperature and strong vibration.

Furthermore, during transmission by SENT, the data remain entirely digital from the conversion in the sensor to the processing in a computer. Thus, in contrast to analog transmission, the signals transmitted in this case are advantageously more precise.

Advantageously, the switching means comprise an arrangement of the open collector output type adapted to transmit the control signal and an arrangement of the open collector output type adapted to transmit the sensor information. Thus, the fact that the actuator part and the sensor part comprise an open collector output stage makes it possible to simplify the merging of the control signal and the acquisition signal into a single main signal.

Advantageously, the switching means furthermore comprise a grounding system adapted to force the connection of the electrical wire to an electrical ground and an inverter system adapted to invert the voltage of the signal of the electrical wire during a control phase.

In one embodiment, the actuator/sensor device furthermore comprises a filtering system between the actuator/sensor pin and the actuator. Such a filtering system therefore makes it possible to use an actuator driven by a signal having a reaction time similar to the recurrence of data transmitted by the sensor, without creating interference.

The present invention furthermore relates to an assembly, characterized in that it comprises an actuator/sensor device as described above and a central processing unit, and in that said actuator/sensor device is connected to the central processing unit via only one electrical wire.

The number of pins of the central processing unit can therefore be reduced. The cabling between the actuator/sensor device and the central processing unit can thus be simplified. Likewise, the handling of the actuator/sensor device can be simplified. Furthermore, since the central processing unit comprises fewer pins, its dimensions can be reduced.

The function of the central processing unit is to control the actuator by sending the control signal, and to acquire the sensor information by interpreting the signal transmitted by the sensor. Use of the same central processing unit to carry out these two functions advantageously allows the central processing unit to distinguish the phases in which the sensor information is transmitted from the phases in which the central processing unit is controlling the actuator.

The present invention also relates to a vehicle, characterized in that it comprises at least one actuator/sensor device as described above. Advantageously, the use of such an actuator/sensor device in a vehicle makes it possible to make the control of the engine simpler and more reliable.

Lastly, the present invention relates to a method for control of an actuator and for acquisition by a sensor, the actuator and the sensor being integrated into the same component, characterized in that it comprises the following phases:

a phase of controlling the actuator by a control signal received by an actuator/sensor pin connecting an input of the actuator and an output of the sensor to the same single electrical wire external to said actuator/sensor device; and a phase of data acquisition by the sensor and transmission of said data by an acquisition signal sent by said actuator/sensor pin when the actuator is not being controlled, and in that switching means cause either the control signal in the control phase or a signal coming from the sensor in the acquisition phase to be sent on the electrical wire.

Such a method advantageously makes it possible to combine the control of an actuator and the acquisition of data via a sensor in a simple way.

BRIEF DESCRIPTION OF THE DRAWINGS

Details and advantages of the present invention will become more apparent on reading the following description, given with reference to the appended schematic drawings, in which:

FIG. 2 is a graphic illustrating the control signal and the signal coming from the sensor, according to one embodiment of the present invention.

DETAILED DESCRIPTION OF THE INVENTION

Figure 1:
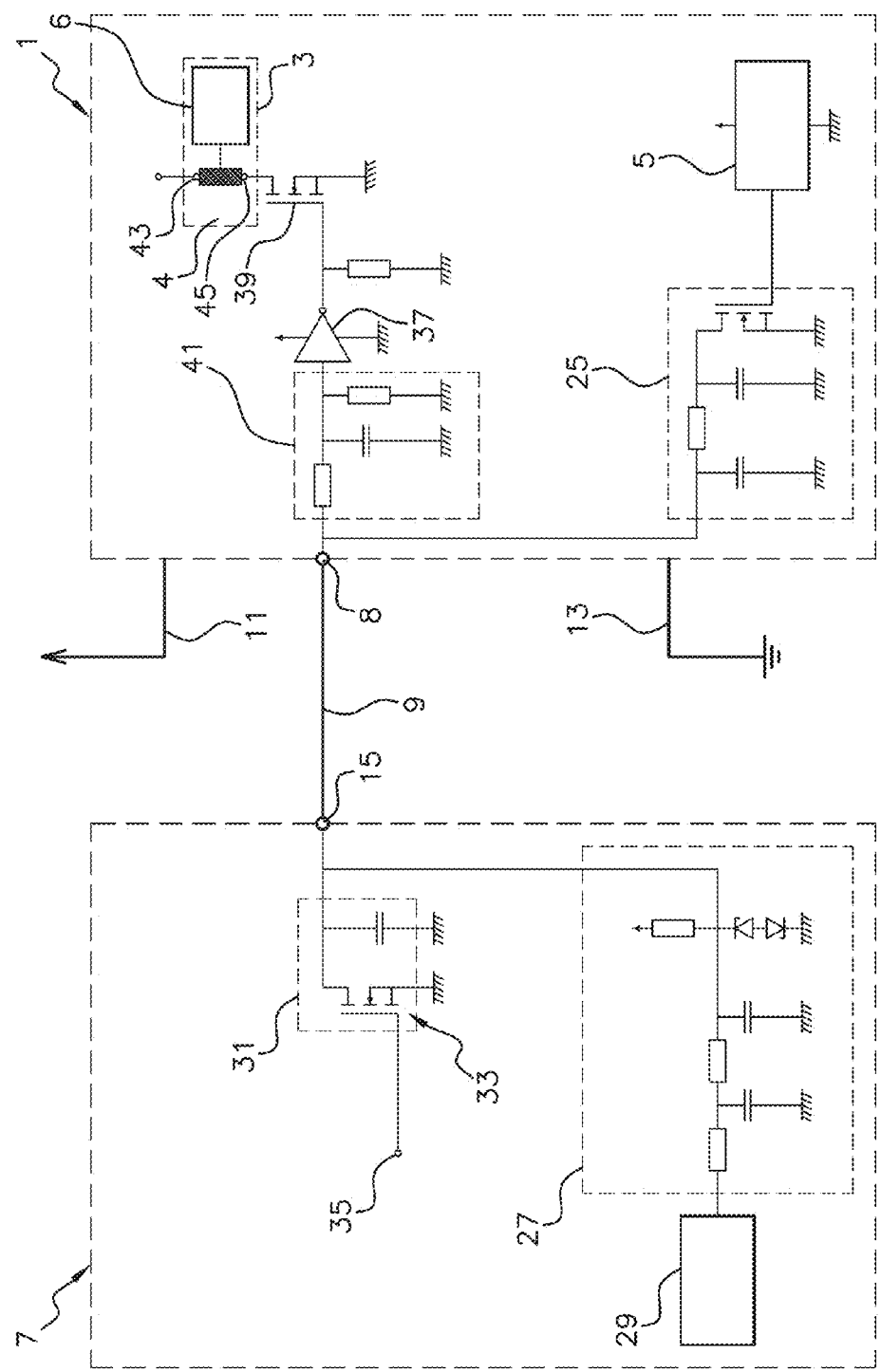
FIG. 1 is a diagram illustrating one embodiment of the present invention.

FIG. 1 illustrates the overall structure of one embodiment of an actuator/sensor device 1 comprising an actuator 3 and a sensor 5.

The actuator 3 is for example, for the rest of the description, a valve of the solenoid type used, for example, for hydraulic circuits or gas circuits. The valve is, for example, an ON/OFF valve.

The actuator 3 preferably comprises a coil 4 and a physical part 6 moving between an opening position and a closing position. The actuator 3 is driven by a control signal coming from a central processing unit 7.

The control signal is preferably pulse width modulated (PWM), that is to say the actuator 3 is controlled as a function of the duty cycle of the control signal. More precisely, the actuator 3 is controlled throughout the length of a high pulse of the control signal (input 35).

The sensor 5 carries out the acquisition of data, and comprises an output which transmits said data to the central processing unit 7 via an acquisition signal. The sensor 5 preferably uses a standardized "Single Edge Nibble Transmission" communication line, referred to as SENT, for transmitting the data. In SENT, four-bit data are transmitted by pulses evaluated by the time between two trailing edges. Analog information measured by the sensor 5 can thus be transmitted digitally via the acquisition signal to the central processing unit 7 in order to be analyzed.

The sensor 5 may therefore be an analog sensor comprising an electronic chip, such as an analog/digital converter, in order to format the analog signal into a digital signal before transmitting it.

The actuator 3 and the sensor 5 are integrated with one another, that is to say they are associated in the same single component, referred to as the actuator/sensor. The actuator/sensor device 1 then comprises a common sensor/actuator pin 8, seen as an input for the actuator 3 and as an output for the sensor 5. The output of the sensor 5 and the input of the actuator 3 are respectively connected to the sensor/actuator pin 8.

The central processing unit 7 comprises a single central pin 15, making it possible both to send the control signal (input 35) and receive the sensor information. The central pin 15 is therefore used as an output in one case, and as an input in the other case.

Furthermore, the control signal (input 35) and the sensor information travel between the actuator/sensor device 1 and the central processing unit 7 via the same single electrical wire 9. Switching means make it possible to alternate the two signals in order to avoid any loss of information. The electrical wire 9 is connected between the central pin 15 and the sensor/actuator pin 8. It therefore connects the central processing unit 7 to the actuator/sensor device 1.

Furthermore, the actuator/sensor device 1 is also supplied electrically by a supply wire 11 and connected to a ground by a ground wire 13. The actuator/sensor device 1 then comprises three connection wires and three pins.

The supply wire 11 and the ground wire 13 may be directly connected respectively to an external power supply and an external ground. In the case of a vehicle, for example, the supply wire 11 and the ground wire 13 are connected to a distributor for recovering the battery voltage and the ground of the vehicle.

FIG. 2 represents a graphic illustrating a main signal 17 representing the voltage of the electrical wire 9 (FIG. 1). FIG. 2 presents the time in seconds on the abscissa, the voltage in volts (for the main signal 17) on the left ordinate, and on the right ordinate the number of valid frames transmitted (illustrated by a curve 23 showing the number of complete frames transmitted).

In order to avoid loss of the control information and of the sensor information, the main signal 17 comprises a first control phase 19 and a second acquisition phase 21.

During the control phase 19, the actuator 3 is driven by the central processing unit 7 by virtue of the control signal (input 35). The central processing unit 7 therefore does not receive data from the sensor 5. The signal 17 therefore corresponds to the control signal (input 35).

During the acquisition phase 21, the sensor 5 transmits data via the acquisition signal to the central processing unit 7. The actuator 3 is therefore no longer controlled. The signal 17 therefore corresponds to the acquisition signal.

In this case, the actuator 3 requires a vehicle battery voltage (generally 12 V) across the terminals of the coil in order to be controlled. When the actuator 3 no longer needs to be controlled, the voltage across the terminals of its coil 4 may be zero. The control signal (input 35) may therefore correspond to a PWM signal which controls the actuator 3 during the high level of this signal.

The sensor 5, for its part, sends frames, each frame corresponding to a measurement carried out by said sensor. For example, the sensor 5 sends one frame every millisecond by using SENT. However, such a measurement recurrence is generally not necessary. This is because the analog datum transmitted generally does not vary every millisecond. Conversely, a recurrence of the order of 10 ms is sufficient.

Thus, in the control phase 19, the main signal 17 is preferably a continuous signal close to 0 V making it possible to control the actuator 3. In the acquisition phase 21, the main signal 17 is preferably in the form of frames.

In the example of FIG. 2, the control signal (input 35) has a duty cycle of 75% at a frequency of 100 Hz. Thus, the control phase 19 lasts 7.5 ms and the acquisition phase 21 lasts 2.5 ms. In the example of FIG. 2, the main signal 17 transmits two complete frames during the acquisition phase 21.

During the acquisition phase 21, the number of frames transmitted by the main signal 17 may vary. However, the main signal 17 should transmit at least one complete frame in each acquisition phase 21 in order not to lose the information from the sensor 5.

In an alternative embodiment, the duty cycle may vary as a function of the actuator 3 used, and its application.

Referring to FIG. 1, the actuator/sensor device 1 may comprise a shaping system 25 connected between the output of the sensor 5 and the electrical wire 9. The function of this shaping system 25 is to generate an electrical signal, also referred to as an acquisition signal, corresponding to the sensor information. It may also have a function of filtering and protecting from the external environment.

The shaping system 25 may comprise a transistor connected in open collector output mode, that is to say on the side of the central processing unit 7.

The central processing unit 7 may comprise a decoding system 27 receiving the acquisition signal via the pin 15. The decoding system 27 decodes the acquisition signal by using SENT, in order to recreate the information provided by the sensor. The central processing unit 7 furthermore comprises a microprocessor 29, which analyzes the data decoded by the decoding system 27.

The internal arrangement of the shaping system 25, and that of the decoding system 27 using SENT, are not described in detail here because they are known to the person skilled in the art.

Furthermore, the central processing unit 7 comprises a grounding system 31 making it possible to send the control signal (input 35) to the actuator 3 without the acquisition signal interfering with the control signal (input 35).

The grounding system 31 is, for example, formed by a transistor 33 having a function of a switch between the central pin 15 and ground. The transistor 33 is driven by the control signal (input 35) transmitted to said transistor via an input 35.

When the central processing unit 7 instigates the control phase 19, the control signal (input 35) is at a high level. The high level of the control signal (input 35) makes it possible to actuate the transistor 33. The latter can then connect the central pin 15 to ground.

Thus, in this control phase 19, the potential of the electrical wire 9 is zero. In other words, the potential of the electrical wire 9 is at ground. Thus, the acquisition signal is forced to ground, the output of the sensor 5 therefore has a zero voltage.

An inverter system 37, for example an amplifier installed as an inverter, makes it possible to invert the value of the voltage in the electrical wire 9 and transmit the inverted signal to the coil 4 of the actuator 3. The output signal of the inverter system 37 is then, preferably, at the same high level as the control signal at the input 35.

The coil 4 is preferably "low side" controlled. It has, at a first terminal 43, a supply voltage, for example the battery voltage, and, at a second terminal 45, a voltage controlled via a transistor 39, operating as a switch, by the inverted signal. The transistor 39 is also installed in open collector output mode, that is to say on the side of the actuator 3.

Still during the control phase 19, the high level of the inverted signal makes it possible to actuate the transistor 39. The second terminal 45 is then connected to ground. A current therefore flows through the coil 4, which makes it possible to actuate the actuator 3.

It is to be noted that, in this embodiment, the control signal (input 35) is inverted two times before being transmitted to the actuator 3.

Conversely, when the central processing unit 7 instigates the acquisition phase 21, the control signal (input 35) is at a low level. The transistor 33 is not activated, the latter being equivalent to an open circuit. The actuator 3 is then not controlled. This is because, the transistor 39 not being actuated, no current flows through the coil 4.

In this case, the central processing unit 7 can read the acquisition signal transmitted by the sensor 5 via the electrical wire 9, since said signal is no longer forced to ground.

Furthermore, the actuator/sensor device 1 may comprise a filtering system 41, preferably of the lowpass type, connected between the input of the inverter system 37 and the output of the shaping system 25. The filtering system is formed, for example, by a passive filter such as an RC circuit, or an active filter using an operational amplifier.

The use of the filtering system 41 depends mainly on the reaction time of the actuator 3. Specifically, the acquisition signal of the sensor 5 must not lead to opening and/or closing of the actuator 3 in the acquisition phase 21, or interfere with the control of said actuator 3 in the control phase 19.

Thus, in the case of a so-called fast actuator, the filtering system 41 prevents the actuator 3 from being affected by the acquisition signal. Conversely, in the case of a so-called slow actuator, the filtering system 41 is not useful since the actuator will not be able to react to the acquisition signal, which has too high a frequency compared with the reaction time of the actuator 3.

The invention also relates to a vehicle using said actuator/sensor device 1. In particular, said device is used for the engine control of the vehicle.

Thus, the actuator 3 may for example be a purge valve of the fuel tank or alternatively an EGR (Exhaust Gas Recirculation) valve. Furthermore, the sensor 5 is for example a pressure sensor or a temperature sensor, or alternatively a position sensor. In fact, the type of sensor 5 depends on the type of actuator 3 and its use.

The actuator/sensor device associated with the central processing unit makes it possible to carry out the engine control efficiently. This is because data are measured by the sensor then read and analyzed by the central processing unit before being used for controlling the actuator.

Furthermore, the present invention also makes it possible to reduce the number of connection wires from five for the prior art to three for the present invention. Furthermore, the present invention makes it possible to reduce the number of pins of the central processing unit used for the actuator and the associated sensor from four, for the prior art, to one for the present invention. This is because, in the description above, the central processing unit is connected to the actuator/sensor device via a single wire allowing the central processing unit to receive sensor information and transmit the control signal (the ground, and the power supply of the sensor and of the actuator coming from the battery of the vehicle). Conversely, in the prior art, the central processing unit is connected to the actuator via an electrical wire to allow it to send the control signal (the supply signal of the actuator coming from the battery of the vehicle). The central processing unit of the prior art is also connected to the sensor via three electrical wires in order to allow it to receive sensor information and transmit the ground signal and the supply voltage to the sensor.

The present invention therefore provides an actuator/sensor device comprising an actuator and an integrated sensor with one wire. The present invention therefore makes it possible to optimize the cabling of the engine control system as well as to reduce its size.

Integration of a second sensor into the actuator/sensor device, in order to transmit up to two different acquisition information items (for example the temperature and the pressure) will not depart from the scope of the invention. In fact, SENT makes it possible to transmit up to two different sensor information items. An additional cost saving may thus be achieved.

Also, the actuator/sensor device may not comprise an integrated sensor, but only an actuator. In this case, only the actuator/sensor device needs to be changed. The structure of such an actuator/sensor device makes it possible not to modify the connections of the vehicle when changing the component.

The present invention may find applications, for example, in the automobile sector but also in any other sector which can profit from the integration of an actuator and a sensor and optimization of the cabling.

Of course, the present invention is not limited to the preferred embodiment and the alternative embodiments presented above by way of nonlimiting examples. It also relates to the alternative embodiments within the scope of the person skilled in the art within the context of the following claims.

The invention claimed is:

1. An actuator/sensor device (1), comprising:
    at least one actuator (3) controlled by a control signal (input 35); and
    at least one sensor (5) transmitting sensor information via an acquisition signal,
    the actuator (3) and the sensor (5) being integrated into a same component,
    wherein the actuator/sensor device further comprises:
        an actuator/sensor pin (8) connecting both a terminal of the actuator (3) and an output of the sensor (5) to a same and single electrical wire (9) that is external to said actuator/sensor device (1); and
        switching means adapted to cause either the control signal in a control phase (19) or the sensor information in an acquisition phase (21) to be sent on the electrical wire (9).
2. The device as claimed in claim 1, wherein the actuator (3) is a valve of the solenoid type.
3. The device as claimed in claim 1, wherein the actuator (3) is driven by a pulse width modulation (PWM) signal.
4. The device as claimed in claim 1, wherein the sensor information is transmitted by using a standardized "Single Edge Nibble Transmission" (SENT) communication line.
5. The device as claimed in claim 1, wherein the switching means comprise an arrangement of the open collector output type adapted to transmit the control signal and an arrangement of the open collector output type adapted to transmit the sensor information.
6. The device as claimed in claim 1, wherein the switching means furthermore comprise a grounding system (31) adapted to force the connection of the electrical wire (9) to an electrical ground and an inverter system (37) adapted to invert the voltage of the signal of the electrical wire (9) during a control phase (19).
7. The device as claimed in claim 1, further comprising a filtering system (41) between the actuator/sensor pin (8) and the actuator (3).
8. An assembly comprising an actuator/sensor device (1) as claimed in claim 1 and a central processing unit (7), wherein said actuator/sensor device (1) is connected to the central processing unit (7) via only one electrical wire (9).
9. A vehicle comprising at least one actuator/sensor device (1) as claimed in claim 1.
10. A method for control of an actuator (3) and for acquisition by a sensor (5), the actuator (3) and the sensor (5) being integrated into the same component, wherein the method comprises the following phases:
    a phase (19) of controlling the actuator by a control signal received by an actuator/sensor pin (8) connecting both a terminal of the actuator (3) and an output of the sensor (5) to a same and single electrical wire (9) external to said actuator/sensor device (1); and
    a phase (21) of data acquisition by the sensor (5) and transmission of said data by an acquisition signal sent by said actuator/sensor pin (8) when the actuator (3) is not being controlled,
    and switching means cause either the control signal in the control phase (19) or signal coming from the sensor in the acquisition phase (21) to be sent on the electrical wire (9).
11. The device as claimed in claim 2, wherein the actuator (3) is driven by a pulse width modulation (PWM) signal.
12. The device as claimed in claim 2, wherein the switching means comprise an arrangement of the open collector output type adapted to transmit the control signal and an arrangement of the open collector output type adapted to transmit the sensor information.
13. The device as claimed in claim 2, wherein the switching means furthermore comprise a grounding system (31) adapted to force the connection of the electrical wire (9) to an electrical ground and an inverter system (37) adapted to invert the voltage of the signal of the electrical wire (9) during a control phase (19).
14. The device as claimed in claim 2, further comprising a filtering system (41) between the actuator/sensor pin (8) and the actuator (3).
15. An assembly an actuator/sensor device (1) as claimed in claim 2 and a central processing unit (7), wherein said actuator/sensor device (1) is connected to the central processing unit (7) via only one electrical wire (9).
16. A vehicle at least one actuator/sensor device (1) as claimed in claim 2.

* * * * *